US011847009B1

(12) United States Patent
Khosrowpour et al.

(10) Patent No.: US 11,847,009 B1
(45) Date of Patent: Dec. 19, 2023

(54) POWER CONTROL FOR IMPROVING FOREGROUND APPLICATION PERFORMANCE IN AN INFORMATION HANDLING SYSTEM

(71) Applicant: Dell Products L.P., Round Rock, TX (US)

(72) Inventors: Farzad Khosrowpour, Pflugerville, TX (US); Mitchell Anthony Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/814,477

(22) Filed: Jul. 22, 2022

(51) Int. Cl.
*G06F 1/3228* (2019.01)
*G06F 11/34* (2006.01)

(52) U.S. Cl.
CPC ........ *G06F 1/3228* (2013.01); *G06F 11/3433* (2013.01)

(58) Field of Classification Search
CPC ..................... G06F 1/3228; G06F 11/3433
See application file for complete search history.

(56) References Cited

U.S. PATENT DOCUMENTS

| 9,547,353 B1* | 1/2017 | Marr | G06F 1/3206 |
|---|---|---|---|
| 11,442,774 B2* | 9/2022 | Park | G06F 9/5038 |
| 2021/0149464 A1* | 5/2021 | Huang | G05B 15/02 |
| 2021/0303054 A1* | 9/2021 | Zhu | G06F 1/3206 |

* cited by examiner

*Primary Examiner* — Terrell S Johnson
(74) *Attorney, Agent, or Firm* — Norton Rose Fulbright US LLP (57) ABSTRACT

This disclosure provides systems, methods, and devices for controlling a processor of an information handling system to improve performance specifically of a foreground application executing on the processor. In a first aspect, a method includes receiving information regarding an application context of a foreground application executing on the information handling system; determining a power modulation for a component of the information handling system based on the application context of the foreground application; and controlling the component of the information handling system based on the power modulation. Other aspects and features are also claimed and described.

20 Claims, 5 Drawing Sheets

POWER CONTROL FOR IMPROVING FOREGROUND APPLICATION PERFORMANCE IN AN INFORMATION HANDLING SYSTEM

FIELD OF THE DISCLOSURE

The instant disclosure relates to information handling systems. More specifically, portions of this disclosure relate to power control in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
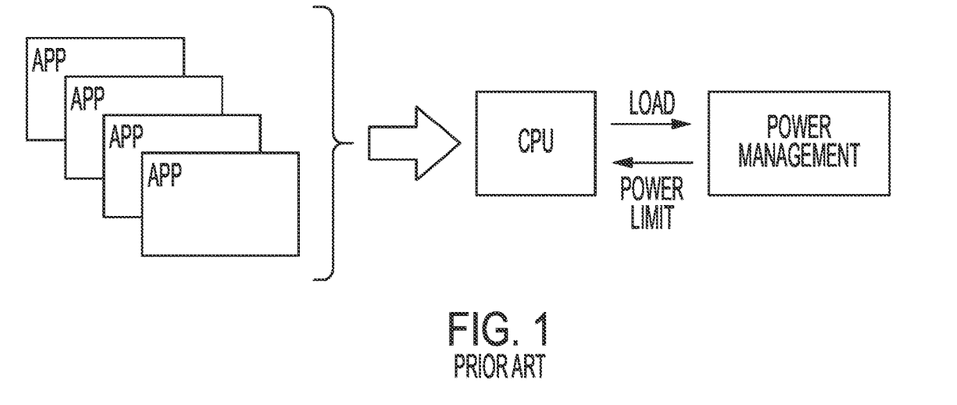
FIG. 1 is an illustration of conventional power management techniques.

Information handling systems have operating limits established that may restrict operations on information, such as to limit power consumption to improve battery health or to limit power consumption to reduce overheating of components. A conventional power management technique is shown in FIG. 1. Applications 102 execute on CPU 104. The processing of data for the applications 102 is performed by operation of transistors in the CPU 104, which consume power and dissipate heat. A load on the CPU 104 may be characterized by a CPU utilization, often expressed as a percentage value of a full load capability of the CPU 104. The load value may be monitored by power management 106. The power management 106 may control a power limit of the CPU 104, which when the limit is lowered has the effect of reducing the computational capability of the CPU 104, reducing power consumed by the CPU 104, and decreasing the temperature of the CPU 104.

SUMMARY

The power management technique of the prior art is sub-optimal because the operational capability of the CPU is controlled without specific information regarding the applications executed by and the data processed by the CPU. By monitoring the overall operation of the CPU without information regarding the specific applications executing on the CPU, the power management system is unable to determine power limit values or perform other controls that improve performance specific to a user's current priorities.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

Applications may change behavior in how computing resources (e.g., CPU capabilities) are used at runtime, such that different CPU performance may be desired at different times to improve the user experience's with the applications. For example, processor capabilities may be controlled to provide improved performance base on whether an application has a sustained or non-sustained (e.g., bursty or semi-active) workload. A bursty workload may be one, for example, that exceeds a threshold CPU capacity level (e.g., expressed as a percentage) for a duration shorter than a predetermined amount (e.g., exceeds 50% capacity but is limited to 100 millisecond duration). A semi-active workload may be one, for example, that remains active but below a threshold CPU capacity level (e.g., expressed as a percentage) for a duration shorter than a predetermined amount (e.g., remains between 25-50% capacity for less than 5 seconds), wherein the active duration is followed by an idle portion that uses below a second threshold CPU capacity level (e.g., a break in the workload of less than 10% is provided every 5 seconds). An active workload may be one, for example, that remains active with no decrease in CPU operation below a threshold CPU capacity level (e.g., expressed as a percentage), such as in an encoding application or gaming application that maintains workload of 30% for longer than ten seconds and often much longer. The processor capabilities may be controlled through power management control by increasing or decreasing power limits of the CPU. The processor capabilities may also be controlled based on the power source, such as whether the power source is a DC battery, an AC wall adaptor, and/or a power rating of the AC wall adaptor. In DC mode (e.g., when running from battery), further limits may be applied due to power constraints from maximum current draw from the battery and/or capacity of the battery. A user experience may be primarily based on the user's interaction with a foreground application (e.g., the application corresponding to the top window on the display). Information regarding this foreground application may be used to optimize power and performance of the processor and other components to provide an improved experience specific for the foreground application while maintaining consistency with other thermal characteristics and requirements.

In some embodiments, the performance of applications, and in particular the foreground application with which the user is interacting, may be improved from default settings by dynamically managing power limit values (e.g., a processor's PL1 settings, or a OEM power value stored in the BIOS USTT or the processor registers) based on a workload profile that specifically identifies an application context of a foreground application. Dynamic control of the power limit (e.g., a OEM power value stored in the BIOS USTT or the processor's PL1 settings) may have an impact on the sustained performance of the CPU, and thus may allow the CPU to obtain performance similar to AC power source performance while operating from battery. Data collection from the foreground and other applications may be used to provide information for efficient runtime decision making to provide dynamic control over the CPU or other component power limits.

In one method of operating an information handling system according to embodiments of this disclosure may include determining whether the information handling system supports API calls or other delivery of application information to a power management operation. If the application information is available, the power management may determine whether the information handling system is plugged in, and if so, determine a current foreground application, determine a CPU usage of the foreground application, determine an overall CPU usage of the system, determine a user setting for power management (e.g., low aggressiveness, medium aggressiveness, or high aggressiveness, indicating how aggressive the CPU should be driven in view of battery constraints).

According to one embodiment, a method may include receiving information regarding an application context of a foreground application executing on an information handling system; determining a power modulation for a component of the information handling system based on the application context of the foreground application; and controlling the component of the information handling system based on the power modulation. In some embodiments, the controlling may be performed at run time during execution of the application. In some embodiments, a mix of sustained and non-sustained workloads may be determined for the application context and the controlling may be dynamically adjusted as the workload of the application changes.

In certain embodiments, the component comprises a processor of the information handling system executing the foreground application; controlling the processor of the information handling system comprises adjusting a power limit value for the processor; and/or determining the power modulation for the component comprises determining a basic input-output system (BIOS)-based user-selectable thermal table (USTT) based on the application context, and wherein controlling the component comprises controlling the component in accordance with the USTT.

In certain embodiments, determining the power modulation includes determining the information regarding the application context indicates the foreground application is a non-sustained workload, and when the foreground application is a non-sustained workload determining the power modulation comprises determining the power limit value is a default value; and determining the information regarding the application context indicates the foreground application is a sustained workload, and when the foreground application is a sustained workload determining the power modulation comprises determining the power limit value is a second power value higher than the default value.

According to another embodiment, an apparatus, such as an information handling system, may include a controller for an information handling system coupled to a processor, and optionally other components of the information handling system.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

In some embodiments of the disclosure, application context of one or more applications may be used to provide dynamic control over power management of an information handling system executing the applications.

Figure 2:
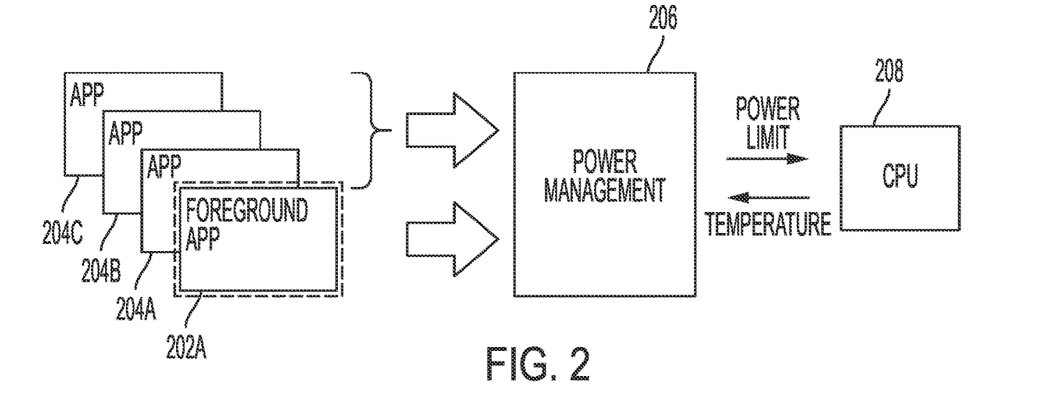
FIG. 2 is a block diagram illustrating power management based on application context of a foreground application according to some embodiments of the disclosure.

FIG. 2 is a block diagram illustrating power management based on application context of a foreground application according to some embodiments of the disclosure. Applications 202A, 204A, 204B, and 204C may execute on central processing unit (CPU) 208. The applications may include foreground applications and background applications. For example, application 202A may be a foreground application and applications 204A, 204B, and 204C may be background applications. A foreground application may be an application that is currently interacting with a user, an application with a highest priority of the executing applications, and/or an application executing as a top window in a graphical user interface (GUI). A background application may be an application of lower priority, an application that is executing but not currently receiving user input, a background processing thread such as an anti-virus or other defender application, an operating service, and/or a driver. Performance of the foreground application 202A, which may be interacting with the user, is the most perceptible to the user because the user may be interacting with the application or otherwise has indicated that application's tasks as high priority for the CPU 208. That is, the user's experience with the information handling system may reflect the performance of the foreground application 202A. If the foreground application 202A is slow, laggy, skipping, unsmooth, or otherwise undesirable, the user may notice the poor performance more readily than poor performance of other (e.g., background) applications 204A, 204B, 204C.

Power management 206 may receive information from which processing characteristics of the foreground application 202A may be distinguished, allowing dynamic control of the CPU 208 based on changing application conditions. For example, power management 206 may receive information specific to foreground application 202A separate from a generic load information representing all executing applications. In some embodiments, power management 206 may receiving individual information, such as an application context, for each executing application 202A, 204A, 204B, 204C.

Power management 206 may control one or more aspects of the CPU 208 based on the application context of the foreground application 202A and/or other information. For example, power management 206 may control a power limit value of the CPU 208, which may reflect a maximum power consumption in units of Watts or using a relative value (e.g., 25%, 50%, 75%). As another example, power management 206 may directly control a supply voltage (Vdd) to the CPU 208 and/or a clock frequency of the CPU 208. Power management 206 may control these aspects of the CPU 208 based on an application context of the foreground application 202A. For example, when the foreground application 202A executes a bursty workload the CPU 208 settings may be adjusted to improve bursty performance. As another example, when the foreground application 202A executes a sustained workload the CPU 208 settings may be adjusted to improve sustained performance. The CPU 208 settings may be adjusted by configuring a setting in the processor registers and/or configuring a OEM power value stored in the BIOS USTT that the processor references when controlling power consumption (which may also take into account the PL1 value).

The power management 206 may be dynamic. As the execution characteristics of the foreground application 202A change the CPU 208 settings may be adjusted to improve performance to match new characteristics. For example, if the foreground application 202A switches from a busty workload (e.g., rendering a first view of a three-dimensional model, pausing for user input to relocate the camera, and rendering a second view of the three-dimensional model at the new camera location) to a sustained workload (e.g., rendering a series of frames from a fixed camera location) the power management 206 may change the CPU 208 settings. A changing foreground application may also result in a different application context. For example, if the user switches windows in the graphical user interface (GUI) from a first application that is an internet browser to a second application that is a mathematical equation solver, the foreground application 202A may change from a bursty workload to a sustained workload. The power management 206 may dynamically adjust CPU 208 settings in accordance with the user switching foreground applications, or otherwise changing the priority of execution of applications 202A, 204A, 204B, and 204C.

Power management 206 may also control CPU 208 settings based on feedback from the CPU 208 and/or other sensors in the information handling system. For example, the CPU 208 may report an internal temperature to power management 206. The power management 206 may determine from the internal temperature whether to reduce CPU 208 capabilities to reduce heat and/or to increase CPU 208 capabilities because of additional available headroom.

Figure 3:
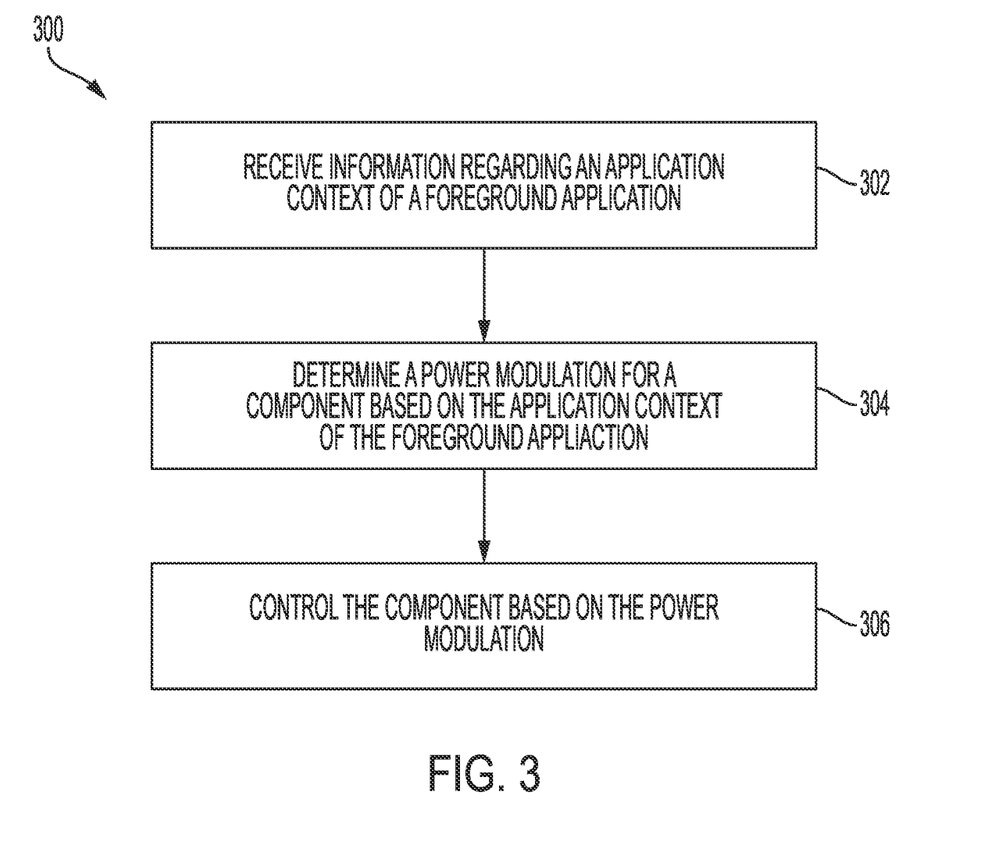
FIG. 3 is a flow chart illustrating a method of controlling an information handling system based on application contexts according to some embodiments of the disclosure.

One example method for operating an information handling system in accordance with the arrangement of FIG. 2, and other arrangements, is shown in FIG. 3. FIG. 3 is a flow chart illustrating a method of controlling an information handling system based on application contexts according to some embodiments of the disclosure. A method 300 includes, at block 302, receiving information regarding an application context of a foreground application. The application context may include information such as an application name, an application type, a workload profile (e.g., sustained, bursty, semi-active, other), a current processing requirement, a historical processing requirement, a predicted processing requirement, and/or historical/current/predicted values for other component usage. The application context may be obtained directly from the application and/or from an operating system executing the application. The application context may include several components including one or more of: detection information (e.g., when the app is launched and or present in the foreground), detection of application class (e.g., what profile of resources does the app use in the information handling system, such as a profile for a gaming application, a video playback application, a document processing application), and detection of application behavior (e.g., level of consumption of the system resources, such as high, medium, low associated with certain resources such as CPU, GPU, memory, storage, network). These detection may be based on operating system and platform-specific performance counters.

At block 304, a power modulation is determined for a component based on the application context of the foreground application received at block 302. The power modulation may include, for example, a throttle value, a power limit value, a load limit, a voltage value, a clock frequency value, and/or a temperature limit value. In some embodiments, the power modulation may be a OEM power value stored in the BIOS USTT that the processor references while controlling power consumption (in addition to considering other values). In some embodiments, the power modulation may be a PL1 value, which is the processor's power draw at base clock speeds, may be a PL2 value, which is the maximum power consumption when the processor is at maximum load and frequency, and/or a timing T (or "Tau") value corresponding to how long the processor may operate at the PL2 value before scaling back to the PL1 value. The PL1 and PL2 values may be values that may be set in processor registers from which the processor further controls power management, such as by scaling frequency and voltage in accordance with the configured PL1 and PL2 values. The PL1 value may function as an effective long-term expected steady state power consumption of the processor, and thus have more impact on user experience. Additional values may be configured, such as a PL3 value, which limiting clock frequency when duty cycle of the processor exceeds the set value, and/or a PL4 value, which sets a maximum upper power limit which the processor preemptively limits frequency to avoid exceeding.

Application-aware optimization may also be used for coordinating the control of USTT, OS/EPP, and Performance Discharge as part of the power modulation of block 304. For example, determining a power modulation may include determining a basic input-output system (BIOS)-based user-selectable thermal table (USTT) based on the application context, and wherein controlling the component comprises controlling the component in accordance with the USTT. A USTT may include a finite number of different pre-defined user-selectable fan speed modes expressed as respective different thermal tables that each define a different fan speed policy as a function of sensed temperature range. Each of these user-selectable modes includes a different set of specified fan speed values for the individual cooling fans of the system as a function of sensed system temperature range. In some embodiments, multiple control points may be used to control the performance and/or power ratios differently in the information handling system. The software may determines at run time an optimal setting. One example control point is performance discharge level, which may impact bursty workloads. Thus, if the application is detected to be bursty then the performance discharge level (e.g., wattage output from a battery and/or AC adaptor) may be a dominant control knob. Additional example control points include PL1 (sustained) value and PL2 (bursty by performance discharge) value, which may be managed at different levels based on the demand from the application.

At block 306, the component is controlled based on the power modulation determined at block 304. For example, when the power modulation includes controlling a power limit appropriate values may be written into the PL1, PL2, PL3, PL4, and/or TAU registers of the CPU. Although setting power limits of a CPU is described in embodiments herein, the power modulation may involve control over alternative or additional components to the CPU based on application context of a foreground application. For example, a fan speed, memory supply volage, memory clock frequency, and/or bus frequency may be adjusted based on the determined power modulation.

Figure 4:
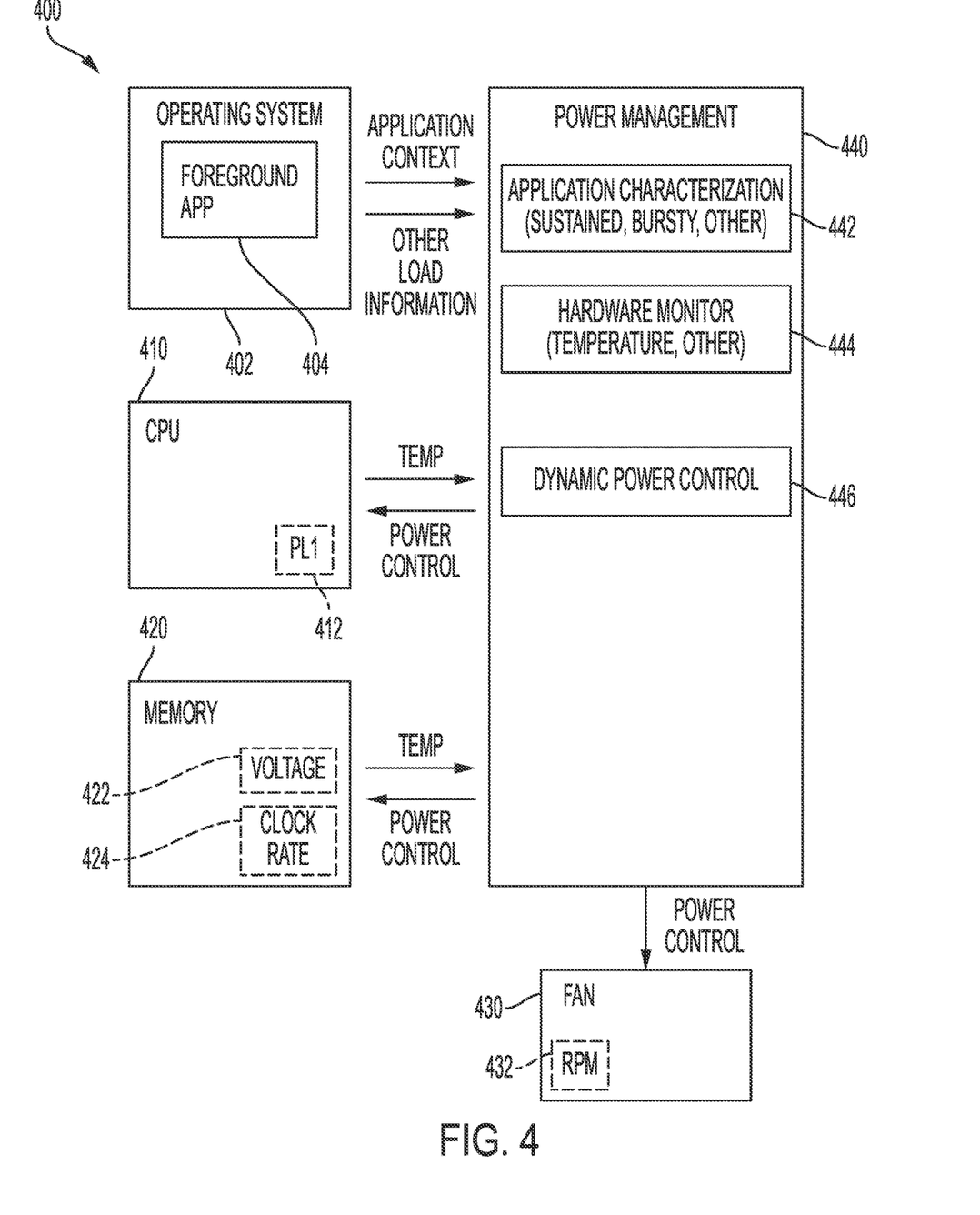
FIG. 4 is a block diagram illustrating controlling an information handling system based on application contexts according to some embodiments of the disclosure.

One detailed implementation of power management according to the techniques of FIG. 2, FIG. 3, and other techniques, is shown in FIG. 4. FIG. 4 is a block diagram illustrating controlling an information handling system based on application contexts according to some embodiments of the disclosure. An information handling system 400 may include a CPU 410 executing an operating system 402. The CPU 402 may be coupled to memory 420 through a bus. The CPU 402 may execute the operating system 402 by retrieving instructions and/or data from memory 420. A fan 430 may be attached to the CPU 410 and/or the memory 420 to cool the components, such as by generating air flow over a heat sink structure to dissipate heat generated by the components. The fan 430 may also be configured to cool the components without being attached to the components, such as by being a case cooling fan for creating air flow inside an enclosure housing the CPU 410 and/or memory 420. The operating system 402 may execute one or more applications, including a foreground application 404.

Power management 440 may control operation of components, including the CPU 410, the memory 420, and the fan 430, based on information regarding the foreground application 404. The operating system 402 may determine application context information regarding execution characteristics of the foreground application 404, and provide the application context to the power management 440. Operating system 402 may have other information to provide to power management 440, such as other load information, whether the system 400 is executing on AC or DC power, or other information.

Power management 440 may process information to perform power control. Power management 440 may include application characterization 442, which may use application context and/or other information to characterize the foreground application into one of a number of categories (e.g., sustained, bursty, semi-active, or other). Power management 440 may also include a hardware monitor 444 for monitoring temperature and other characteristics of system 400. Dynamic power control 446 of power management 440 may use the application characterization 442 and/or hardware information 444 to determine a power modulation for CPU 410, memory 420, and/or fan 430 to improve performance of specifically the foreground application 404. For example, when: (1) application characterization 442 of foreground application 404 based on application context provided by operating system 402 indicates that the foreground application 404 is a bursty application; (2) hardware monitor 444 indicates that the temperature of the CPU 410 is below a threshold temperature; and (3) hardware monitor 444 indicates that the system 400 is operating from DC power; then dynamic power control 446 may set a higher PL1 value 412 into a register for the CPU 410.

The PL1 value under certain conditions while operating on DC power may be higher than a default value used when operating on DC power. For example, a PL1 of the CPU 410 may default to 35 Watts when on AC power and 25 Watts when on DC power. Bursty loads may be unnecessarily limited by the lower PL1 value on DC power. Short bursts of processing from a foreground application can be handled at higher PL1 values because the time between bursts allows the CPU 410 to cool off. Defaulting to 25 Watts on DC power artificially restricts operation of the CPU 410 in performing the bursty loads. When application characterization 442 determines a bursty profile is executed by the foreground application 404 the PL1 value may be increased to the AC power default value or another value higher than the DC power default value. For example, increasing the PL1 value to 35 Watts while on DC power allows the CPU 410 to process the bursty operations and improve the user experience when interacting with foreground application 404.

Figure 5:
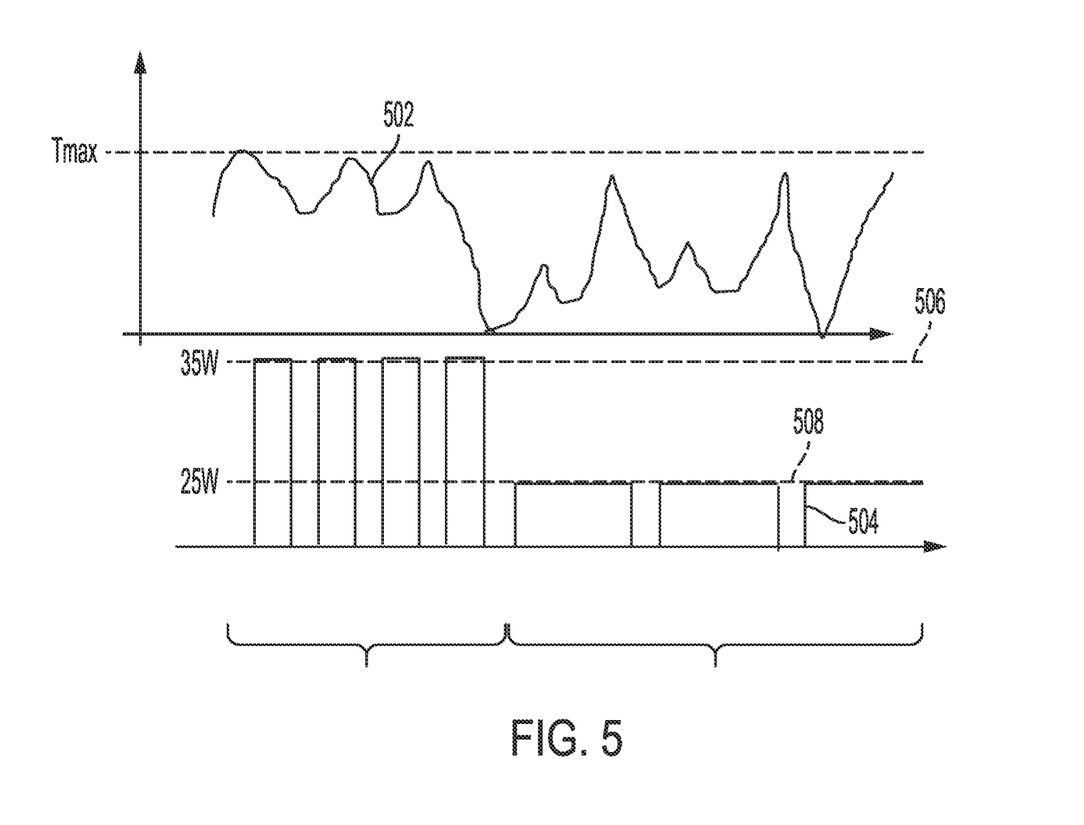
FIG. 5 is a graph illustrating dynamic power management based on application contexts according to some embodiments of the disclosure.

An example modulation of power settings in system 400 is shown in FIG. 5 using a higher PL1 value while on DC power to gain some of the advantages described herein. FIG. 5 is a graph illustrating dynamic power management based on application contexts according to some embodiments of the disclosure. A graph 500 shows a line 502 corresponds to a temperature of a CPU in an information handling system. A line 504 corresponds to a power limit value (e.g., a PL1 value) of the CPU. A first power limit value line 506 is shown at 35 Watts. A second power limit value line 508 is shown at 25 Watts. The line 506 may correspond to a default PL1 value on AC power; and the line 508 may correspond to a default PL1 value on DC power. During a first time period 512, a first application context for a first foreground application characterizes the foreground application as a bursty workload. During time period 512, the power limit for the CPU is the value of line 506. At the end of time period 512, a user switches applications such that a second application becomes the foreground application. During a second time period 514, a second application context for a second foreground application characterizes the foreground application as a non-bursty (e.g., sustained or semi-active) workload. During time period 514, the power limit for the CPU is adjusted to the value of line 508.

Referring back to FIG. 4, other power modulations within system 400 may be controlled based on application context and/or other information regarding the foreground application 404 although power limits for the CPU 410 are described in some examples herein. For example, a voltage 422 of memory 420, clock rate 424 of memory 420, and/or an RPM value 432 of fan 430 may be controlled to improve performance of the system 400.

Power management 440 may be executed by hardware and/or software. For example, power management 440 may be executed by a controller, such as a baseboard management controller (BMC), power management integrated circuit (PMIC), and/or a processor controller hub (PCH) in the information handling system may control power modulation within the system 400. As another example, power management 440 may be executed as an operating system service executing on the CPU 410. As a further example, power management 440 may be executed through information collection from an operating system service that provides application context information to a BMC, PMIC, and/or PCH, which controls the CPU 410, memory 420, and/or fan 430.

These example embodiments describe and illustrate various power control for an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 6.

Figure 6:
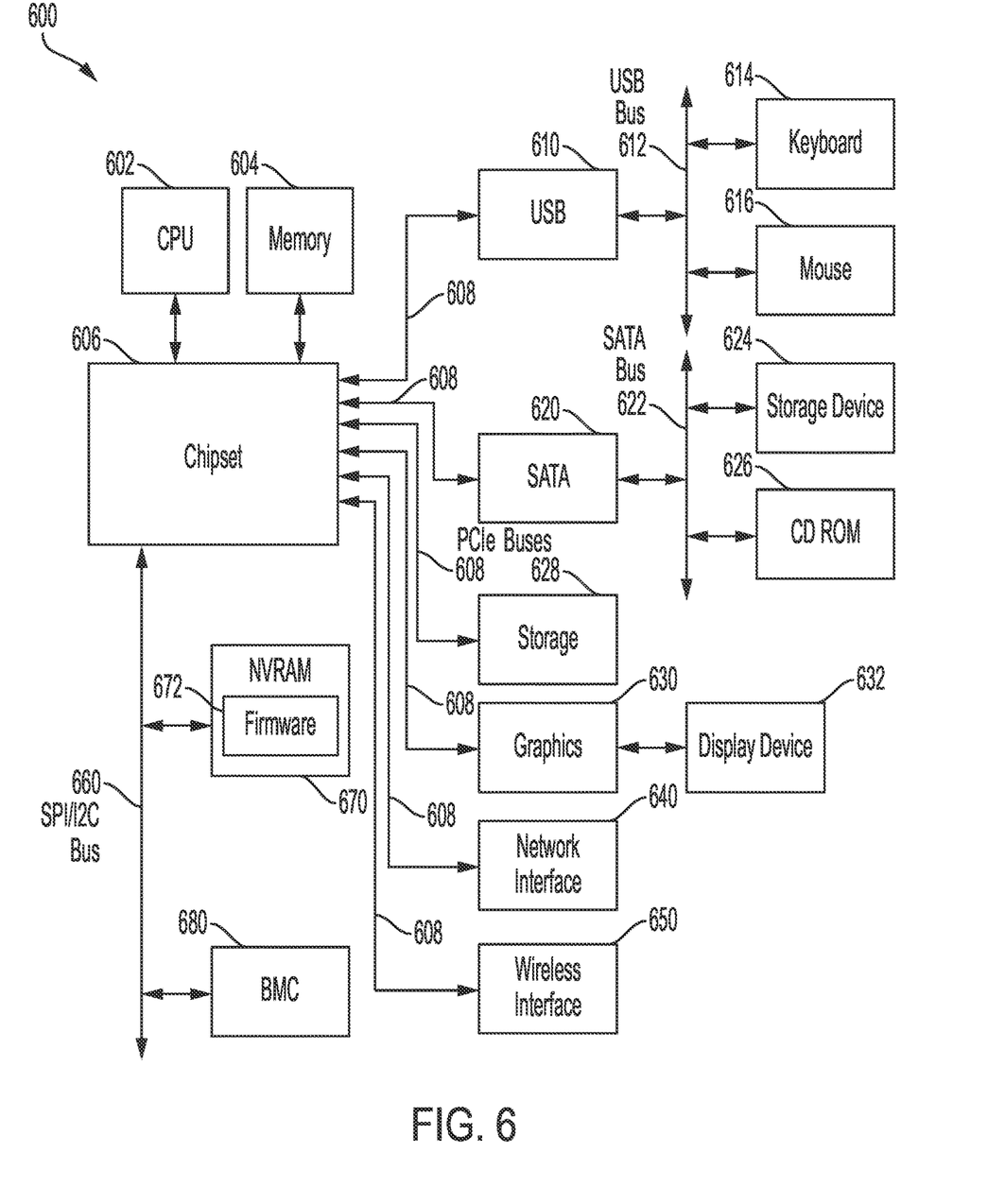
FIG. 6 is a schematic block diagram of an example information handling system according to some embodiments of the disclosure.

FIG. 6 illustrates an example information handling system 600. Information handling system 600 may include a processor 602 (e.g., a central processing unit (CPU)), a memory (e.g., a dynamic random-access memory (DRAM)) 604, and a chipset 606. In some embodiments, one or more of the processor 602, the memory 604, and the chipset 606 may be included on a motherboard (also referred to as a mainboard), which is a printed circuit board (PCB) with embedded conductors organized as transmission lines between the processor 602, the memory 604, the chipset 606, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 602, the memory 604, the chipset 606, and/or other components may be organized as a System on Chip (SoC).

The processor 602 may execute program code by accessing instructions loaded into memory 604 from a storage device, executing the instructions to operate on data also loaded into memory 604 from a storage device, and generate output data that is stored back into memory 604 or sent to another component. The processor 602 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 602 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 606 may facilitate the transfer of data between the processor 602, the memory 604, and other components. In some embodiments, chipset 606 may include two or more integrated circuits (ICs), such as a northbridge controller coupled to the processor 602, the memory 604, and a southbridge controller, with the southbridge controller coupled to the other components such as USB 610, SATA 620, and PCIe buses 608. The chipset 606 may couple to other components through one or more PCIe buses 608.

Some components may be coupled to one bus line of the PCIe buses 608, whereas some components may be coupled to more than one bus line of the PCIe buses 608. One example component is a universal serial bus (USB) controller 610, which interfaces the chipset 606 to a USB bus 612. A USB bus 612 may couple input/output components such as a keyboard 614 and a mouse 616, but also other components such as USB flash drives, or another information handling system. Another example component is a SATA bus controller 620, which couples the chipset 606 to a SATA bus 622. The SATA bus 622 may facilitate efficient transfer of data between the chipset 606 and components coupled to the chipset 606 and a storage device 624 (e.g., a hard disk drive (HDD) or solid-state disk drive (SDD)) and/or a compact disc read-only memory (CD-ROM) 626. The PCIe bus 608 may also couple the chipset 606 directly to a storage device 628 (e.g., a solid-state disk drive (SDD)). A further example of an example component is a graphics device 630 (e.g., a graphics processing unit (GPU)) for generating output to a display device 632, a network interface controller (NIC) 640, and/or a wireless interface 650 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 606 may also be coupled to a serial peripheral interface (SPI) and/or Inter-Integrated Circuit (I2C) bus 660, which couples the chipset 606 to system management components. For example, a non-volatile random-access memory (NVRAM) 670 for storing firmware 672 may be coupled to the bus 660. As another example, a controller, such as a baseboard management controller (BMC) 680, may be coupled to the chipset 606 through the bus 660. BMC 680 may be referred to as a service processor or embedded controller (EC). Capabilities and functions provided by BMC 680 may vary considerably based on the type of information handling system. For example, the term baseboard management system may be used to describe an embedded processor included at a server, while an embedded controller may be found in a consumer-level device. As disclosed herein, BMC 680 represents a processing device different from processor 602, which provides various management functions for information handling system 600. For example, an embedded controller may be responsible for power management, cooling management, and the like. An embedded controller included at a data storage system may be referred to as a storage enclosure processor or a chassis processor.

System 600 may include additional processors that are configured to provide localized or specific control functions, such as a battery management controller. Bus 660 can include one or more busses, including a Serial Peripheral Interface (SPI) bus, an Inter-Integrated Circuit (I2C) bus, a system management bus (SMBUS), a power management bus (PMBUS), or the like. BMC 680 may be configured to provide out-of-band access to devices at information handling system 600. Out-of-band access in the context of the bus 660 may refer to operations performed prior to execution of firmware 672 by processor 602 to initialize operation of system 600.

Firmware 672 may include instructions executable by processor 102 to initialize and test the hardware components of system 600. For example, the instructions may cause the processor 602 to execute a power-on self-test (POST). The instructions may further cause the processor 602 to load a boot loader or an operating system (OS) from a mass storage device. Firmware 672 additionally may provide an abstraction layer for the hardware, such as a consistent way for application programs and operating systems to interact with the keyboard, display, and other input/output devices. When power is first applied to information handling system 600, the system may begin a sequence of initialization procedures, such as a boot procedure or a secure boot procedure. During the initialization sequence, also referred to as a boot sequence, components of system 600 may be configured and enabled for operation and device drivers may be installed. Device drivers may provide an interface through which other components of the system 600 can communicate with a corresponding device. The firmware 672 may include a basic input-output system (BIOS) and/or include a unified extensible firmware interface (UEFI). Firmware 672 may also include one or more firmware modules of the information handling system. Additionally, configuration settings for the firmware 672 and firmware of the information handling system 600 may be stored in the NVRAM 670. NVRAM 670 may, for example, be a non-volatile firmware memory of the information handling system 600 and may store a firmware memory map namespace 600 of the information handling system. NVRAM 670 may further store one or more container-specific firmware memory map namespaces for one or more containers concurrently executed by the information handling system.

Information handling system 600 may include additional components and additional busses, not shown for clarity. For example, system 600 may include multiple processor cores (either within processor 602 or separately coupled to the chipset 606 or through the PCIe buses 608), audio devices (such as may be coupled to the chipset 606 through one of the PCIe busses 608), or the like. While a particular arrangement of bus technologies and interconnections is illustrated for the purpose of example, one of skill will appreciate that the techniques disclosed herein are applicable to other system architectures. System 600 may include multiple processors and/or redundant bus controllers. In some embodiments, one or more components may be integrated together in an integrated circuit (IC), which is circuitry built on a common substrate. For example, portions of chipset 606 can be integrated within processor 602. Additional components of information handling system 600 may include one or more storage devices that may store machine-executable code, one or more communications ports for communicating with external devices, and various input and output (I/O) devices, such as a keyboard, a mouse, and a video display.

In some embodiments, processor 602 may include multiple processors, such as multiple processing cores for parallel processing by the information handling system 600. For example, the information handling system 600 may include a server comprising multiple processors for parallel processing. In some embodiments, the information handling system 600 may support virtual machine (VM) operation, with multiple virtualized instances of one or more operating systems executed in parallel by the information handling system 600. For example, resources, such as processors or processing cores of the information handling system may be assigned to multiple containerized instances of one or more operating systems of the information handling system 600 executed in parallel. A container may, for example, be a virtual machine executed by the information handling system 600 for execution of an instance of an operating system by the information handling system 600. Thus, for example, multiple users may remotely connect to the information handling system 600, such as in a cloud computing configuration, to utilize resources of the information handling system 600, such as memory, processors, and other hardware, firmware, and software capabilities of the information handling system 600. Parallel execution of multiple containers by the information handling system 600 may allow the information handling system 600 to execute tasks for multiple users in parallel secure virtual environments.

The schematic flow chart diagram of FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a processor or controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving information regarding an application context of a foreground application executing on an information handling system;
   determining a power modulation for a component of the information handling system based on the application context of the foreground application, wherein determining the power modulation for the component comprises accessing a basic input-output system (BIOS)-based user-selectable thermal table (USTT) based on the application context; and
   controlling the component of the information handling system based on the power modulation.

2. The method of claim 1, wherein the component comprises a processor of the information handling system executing the foreground application.

3. The method of claim 2, wherein controlling the processor of the information handling system comprises adjusting a power limit value for the processor.

4. The method of claim 3, wherein determining the power modulation comprises:
   determining the information regarding the application context indicates the foreground application is a non-sustained workload, and when the foreground application is a non-sustained workload determining the power modulation comprises determining the power limit value is a default value; and
   determining the information regarding the application context indicates the foreground application is a sustained workload, and when the foreground application is a sustained workload determining the power modulation comprises determining the power limit value is a second power limit value higher than the default value.

5. The method of claim 4, further comprises:
   determining a temperature of the processor while controlling the processor based on the second power limit value; and
   reducing the power limit value for the processor when the temperature exceeds a threshold temperature value.

6. The method of claim 5, wherein the default value corresponds to a power limit value for operating from a battery power source, and wherein the second power limit value corresponds to a power limit value for operating from a non-battery power source.

7. The method of claim 1, further comprising:
determining a second application becomes the foreground application;
receiving second information regarding a second application context of a second application executing as the foreground application on the information handling system;
determining a second power modulation for the component of the information handling system based on the second application context of the second application; and
controlling the component of the information handling system based on the second power modulation.

8. The method of claim 1, wherein the information indicates one or more of a name of the application, an application type of the application, a workload profile associated with the application, a current processing usage associated with the application, a historical processing usage associated with the application, a predicted processing usage associated with the application, or a component usage associated with the application.

9. The method of claim 1, wherein the information is received from the application or from an operating system that executes the application.

10. An apparatus, comprising:
a memory; and
a controller, wherein the controller is configured to perform steps comprising:
receiving information regarding an application context of a foreground application executing on an information handling system;
determining a power modulation for a component of the information handling system based on the application context of the foreground application, wherein determining the power modulation for the component comprises accessing a basic input-output system (BIOS)-based user-selectable thermal table (USTT) based on the application context; and
controlling the component of the information handling system based on the power modulation.

11. The apparatus of claim 10, wherein the component comprises a processor of the information handling system executing the foreground application.

12. The apparatus of claim 11, wherein controlling the processor of the information handling system comprises adjusting a power limit value for the processor.

13. The apparatus of claim 12, wherein determining the power modulation comprises:
determining the information regarding the application context indicates the foreground application is a non-sustained workload, and when the foreground application is a non-sustained workload determining the power modulation comprises determining the power limit value is a default value; and
determining the information regarding the application context indicates the foreground application is a sustained workload, and when the foreground application is a sustained workload determining the power modulation comprises determining the power limit value is a second power limit value higher than the default value.

14. The apparatus of claim 13, wherein the processor is further configured to perform steps including:
determining a temperature of the processor while controlling the processor based on the second power limit value; and
reducing the power limit value for the processor when the temperature exceeds a threshold temperature value.

15. The apparatus of claim 14, wherein the default value corresponds to a power limit value for operating from a battery power source, and wherein the second power limit value corresponds to a power limit value for operating from a non-battery power source.

16. An information handling system, comprising:
a memory;
a processor coupled to the memory, wherein the processor is configured to execute instructions stored in the memory; and
a controller coupled to the processor, wherein the controller is configured to perform steps comprising:
receiving information regarding an application context of a foreground application executing on the information handling system;
determining a power modulation for a component of the information handling system based on the application context of the foreground application, wherein determining the power modulation for the component comprises accessing a basic input-output system (BIOS)-based user-selectable thermal table (USTT) based on the application context; and
controlling the component of the information handling system based on the power modulation.

17. The information handling system of claim 16, wherein the component comprises a processor of the information handling system executing the foreground application.

18. The information handling system of claim 17, wherein controlling the processor of the information handling system comprises adjusting a power limit value for the processor.

19. The information handling system of claim 18, wherein determining the power modulation comprises:
determining the information regarding the application context indicates the foreground application is a non-sustained workload, and when the foreground application is a non-sustained workload determining the power modulation comprises determining the power limit value is a default value; and
determining the information regarding the application context indicates the foreground application is a sustained workload, and when the foreground application is a sustained workload determining the power modulation comprises determining the power limit value is a second power limit value higher than the default value.

20. The information handling system of claim 19, wherein the default value corresponds to a power limit value for operating from a battery power source, and wherein the second power limit value corresponds to a power limit value for operating from a non-battery power source.

* * * * *